(12) United States Patent
Goering

(10) Patent No.: US 11,192,312 B2
(45) Date of Patent: Dec. 7, 2021

(54) THREE-DIMENSIONAL WOVEN PREFORMS FOR OMEGA STIFFENERS

(71) Applicant: Albany Engineered Composites, Inc., Rochester, NH (US)

(72) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 494 days.

(21) Appl. No.: 16/154,961

(22) Filed: Oct. 9, 2018

(65) Prior Publication Data

US 2019/0111635 A1 Apr. 18, 2019

Related U.S. Application Data

(60) Provisional application No. 62/571,467, filed on Oct. 12, 2017.

(51) Int. Cl.
| | | |
|---|---|---|
| *B29C 70/22* | (2006.01) | |
| *D03D 11/02* | (2006.01) | |
| *B29B 11/16* | (2006.01) | |
| *D03D 25/00* | (2006.01) | |

(52) U.S. Cl.
CPC .......... *B29C 70/222* (2013.01); *B29B 11/16* (2013.01); *D03D 11/02* (2013.01); *D03D 25/005* (2013.01); *D10B 2101/06* (2013.01); *D10B 2101/08* (2013.01); *D10B 2101/12* (2013.01); *D10B 2321/021* (2013.01); *D10B 2331/021* (2013.01); *D10B 2403/024* (2013.01); *D10B 2403/033* (2013.01); *D10B 2505/02* (2013.01)

(58) Field of Classification Search
CPC ....... B29B 11/16; B29C 70/222; D03D 11/02; D03D 25/005; D10B 2101/06; D10B 2101/08; D10B 2101/12; D10B 2321/021; D10B 2331/021; D10B 2403/024; D10B 2403/033; D10B 2505/02
See application file for complete search history.

(56) References Cited

U.S. PATENT DOCUMENTS

| | | |
|---|---|---|
| 8,523,553 B2 | 9/2013 | Martin et al. |
| 8,540,921 B2 | 9/2013 | Senibi et al. |
| 8,597,771 B2 | 12/2013 | Arévalo Rodriguez |
| 8,632,710 B2 | 1/2014 | Petersson et al. |
| 8,795,567 B2 | 8/2014 | Bland |
| 8,859,083 B2 | 10/2014 | Goering |
| 8,905,350 B2 | 12/2014 | Meyer et al. |

(Continued)

FOREIGN PATENT DOCUMENTS

WO WO 2011/107708 A1 9/2011

OTHER PUBLICATIONS

International Search Report and Written Opinion prepared by the European Patent Office, acting as the International Searching Authority, for corresponding international application PCT/US2018/054938 dated Jan. 23, 2019.

*Primary Examiner* — Arti Singh-Pandey
(74) *Attorney, Agent, or Firm* — McCarter & English, LLP

(57) ABSTRACT

Disclosed is a method of forming a 3D woven omega-shaped stiffener by flat weaving a plurality of layers of interwoven warp and weft fibers to form a flat woven fabric having a cap portion, a first and a second web portion, a first and second foot portion, and an inner wrap portion. The 3D woven fabric is woven so that least some of the weft fibers are continuous across a juncture between the web portion and the foot portions. The flat woven fabric is then formed into the omega shape.

22 Claims, 4 Drawing Sheets

(56) References Cited

U.S. PATENT DOCUMENTS

| | | |
|---|---|---|
| 9,193,433 B2 | 11/2015 | Hugon et al. |
| 2007/0176327 A1 | 8/2007 | Petersson et al. |
| 2013/0270389 A1 | 10/2013 | Godon et al. |
| 2013/0344291 A1 | 12/2013 | Pearson et al. |
| 2016/0376735 A1 | 12/2016 | Lorrillard et al. |

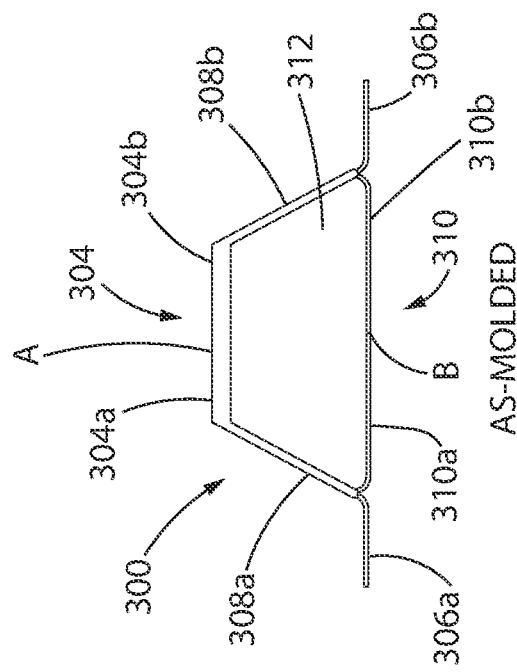
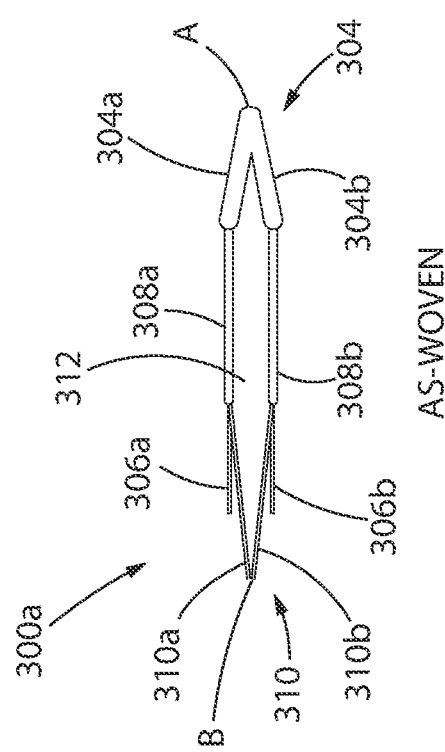

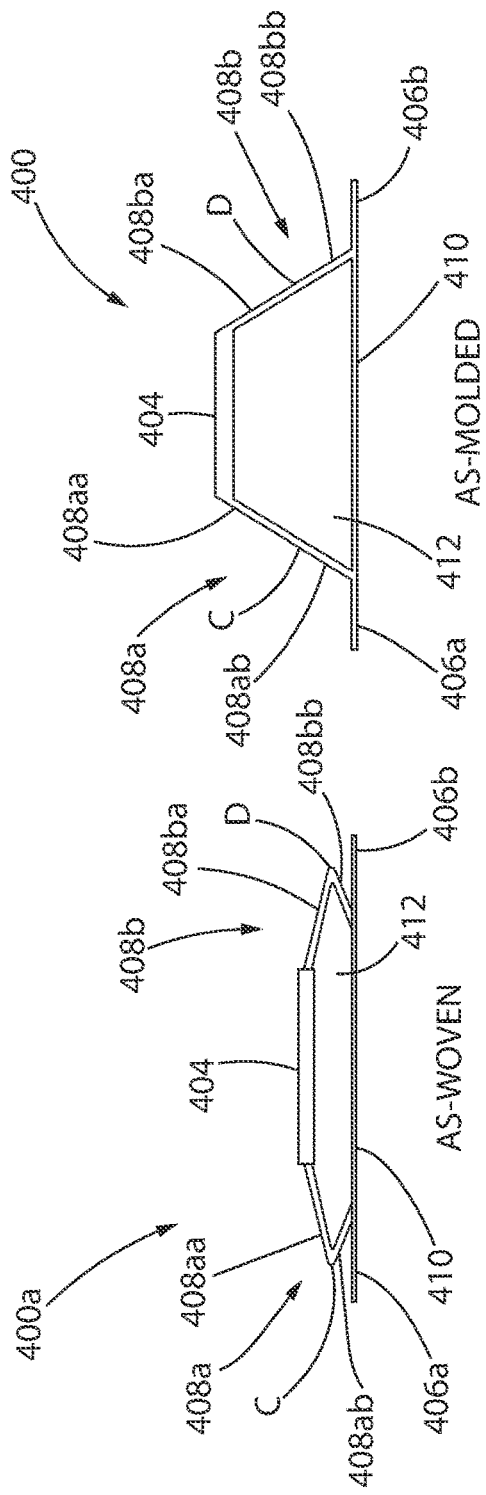
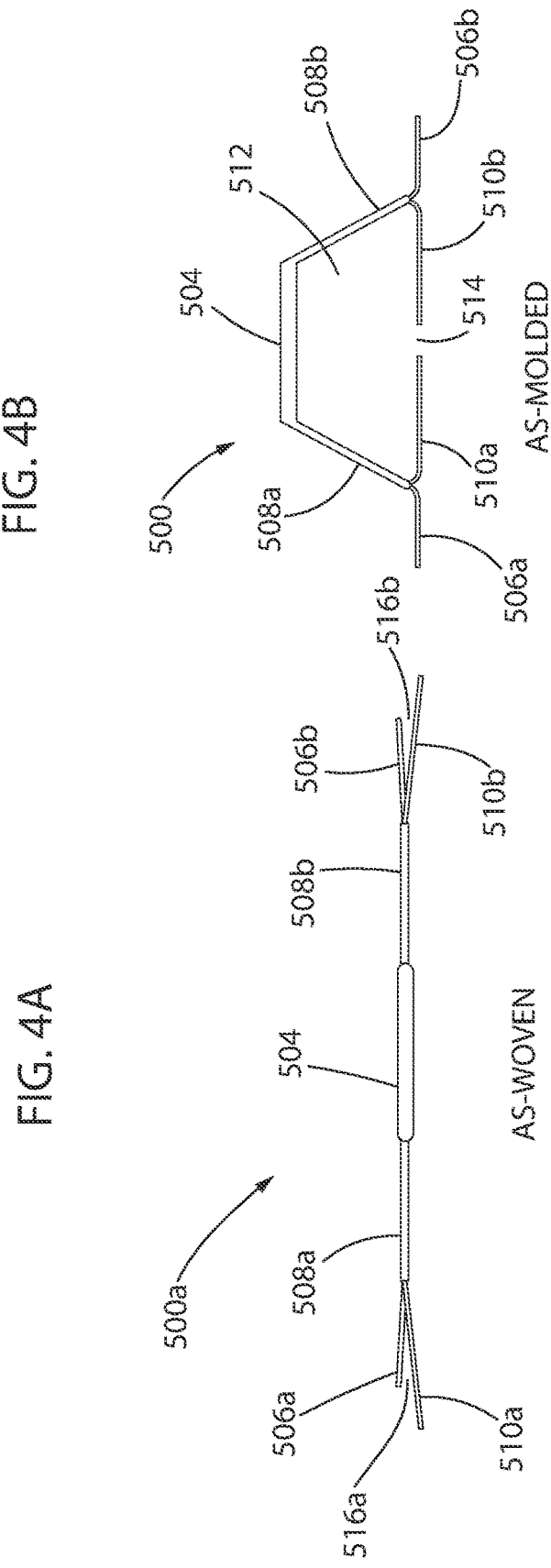

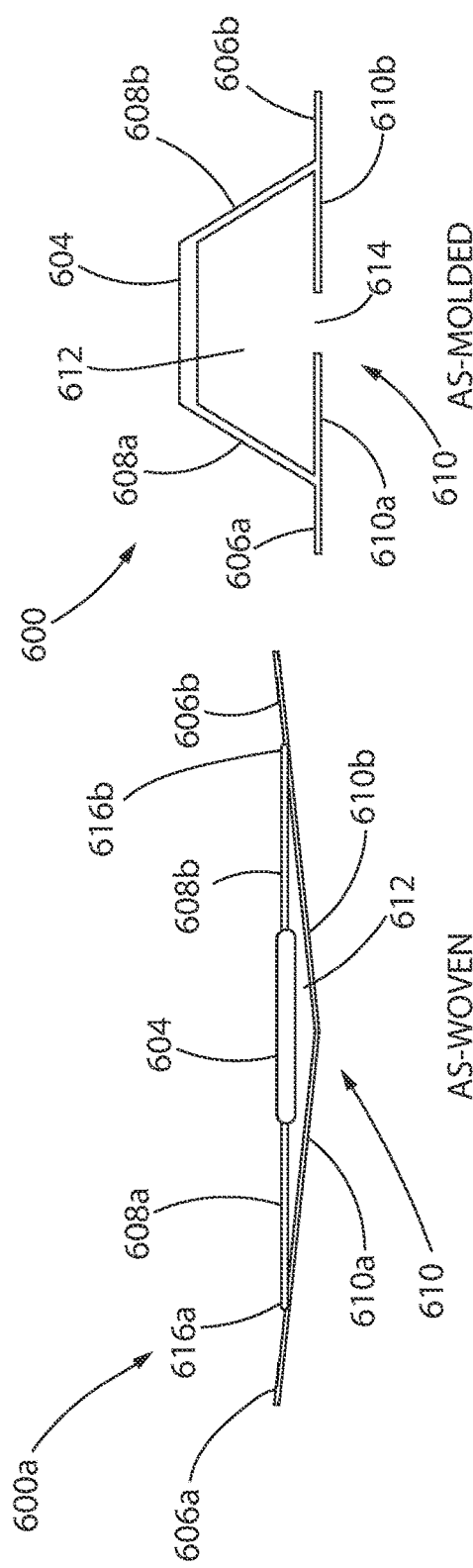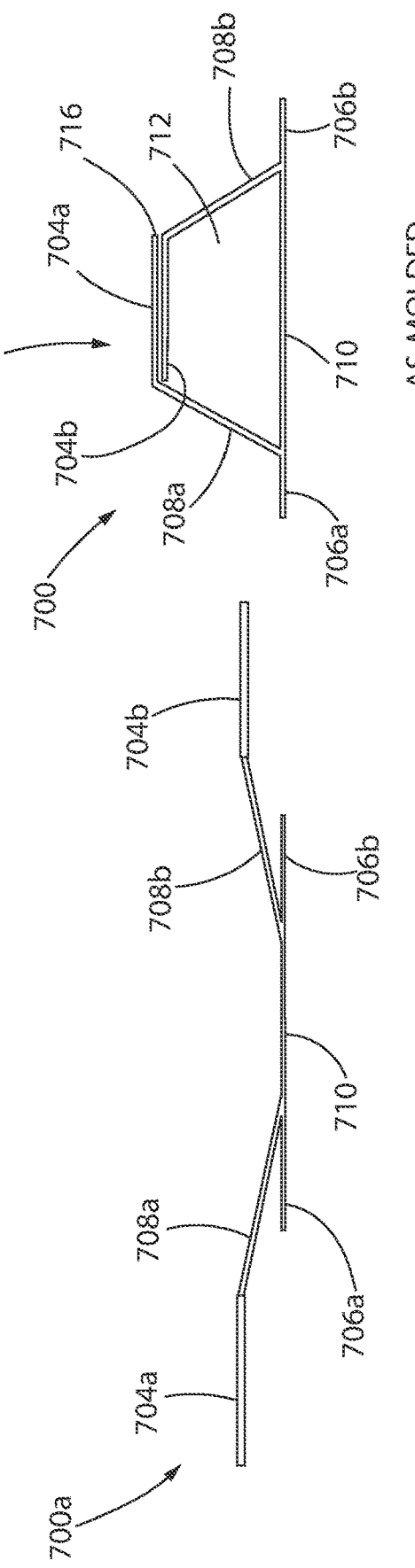

THREE-DIMENSIONAL WOVEN PREFORMS FOR OMEGA STIFFENERS

BACKGROUND

1. Field of the Disclosure

The disclosure relates to three-dimensional woven preforms and methods for making same. In particular, the woven preform can be used as a stiffener for substantially flat panels.

2. Related Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials that exhibit desired physical, thermal, chemical and/or other properties including great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, bismaleimide, vinyl-ester, ceramic, carbon and/or other materials, which also exhibit desired physical, thermal, chemical, and/or other properties.

The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note that after being so cured, the then solidified masses of the matrix material normally are strongly adhered to the reinforcing material (e.g., the reinforcement preform). As a result, stress on the finished component, particularly through the matrix material acting as an adhesive between fibers, may be effectively transferred to and borne by the constituent material of the reinforcement preform.

Relatively flat composite panels find use in many industries including aircraft, aerospace, automotive, and civil structures. In some cases the panels may require additional stiffness to aid the structures in avoiding damage or unwanted deformation. For example, an aircraft portion such as the fuselage is a structure that is usually made up of panels that include an outside panel and an inside panel separated from one another and forming a channel therebetween. The panels are reinforced, inside the fuselage, by reinforcing frames or stiffeners disposed within the channel between the panels. The reinforcing stiffeners are positioned along the outside panel of the fuselage sections and are substantially perpendicular to a longitudinal axis of the fuselage surface. The stiffeners are supported by the inside fuselage panel, which reduces deformation of the outside fuselage panel from an externally applied force.

SUMMARY

The method of forming a 3D woven stiffener includes flat weaving a plurality of layers of interwoven warp and weft fibers; interweaving portions of some of the layers with other layers into a flat woven fabric having a cap portion, a first and a second web portion, a first and second foot portion, and an inner wrap portion; and forming the flat woven fabric to form an omega-shaped stiffener having an inner space. At least some of the weft fibers are continuous across a juncture between the web portion and the foot portions.

In some embodiments the inner space of the stiffener is closed.

In an embodiment having a closed inner space the interweaving of the portions of some of the layers with other layers includes causing the cap portion to have two cap areas folded against one another and the inner wrap portion to have two inner wrap areas folded against one another. The cap areas can be folded so that the two cap areas are substantially collinear and the two inner wrap areas can be unfolded so that the inner wrap areas are substantially collinear.

In another embodiment having a closed inner space the interweaving of the portions of some of the layers with other layers includes causing the first web portion and the second web portion to have respective two web areas folded against one another. The first web areas of the first web portion can be unfolded so that the first web areas of the first web portion are substantially collinear. The second web areas of the second web portion can be unfolded so that the second web areas of the second web portion are substantially collinear.

In another embodiment having a closed inner space the interweaving of the portions of some of the layers with other layers includes causing the cap portion to have a first cap area and a second cap area, each of the cap areas having a thickness that is less than a desired thickness of the cap portion. The first cap area is woven to the first web portion, the second cap area is woven to the second web area and the first and second cap area are separated from one another. The first web portion with first cap area, and the second web portion with the second cap area can be formed so the first cap area lies upon the second cap area to form the cap portion of the woven stiffener.

In some embodiments the inner space of the stiffener is open.

In an embodiment having an open inner space the inner wrap portion is woven into a first inner wrap area and a second inner wrap area separated from one another by the first web portion, cap portion, and second web portion. The first inner wrap area and second inner wrap area can be formed to be substantially collinear and separated from one another by a gap.

In another embodiment having an open inner space the inner wrap portion has a first inner wrap area and a contiguous second inner wrap area. The first inner wrap area and second inner wrap area can be formed to be substantially collinear and form a gap between the first inner wrap area and second inner wrap area. The method can include cutting a portion of the first and second inner wrap areas.

In any of the embodiments the cap portion may be thicker than the web portions and the web portions thicker than the foot portions.

In any of the embodiments the omega-shaped stiffener can be impregnated with a matrix material.

A 3D woven stiffener has a plurality of layers of interwoven warp and weft fibers. Some of the layers are interwoven with other layers into a flat woven fabric having a cap portion, a first and a second web portion, a first and second foot portion, and an inner wrap portion. At least some of the weft fibers are continuous across a juncture between the web portion and the foot portions. The inner space of the stiffener can be either closed or open. The cap portion may be thicker than the web portions and the web portions thicker than the foot portions The 3D woven stiffener can be impregnated with a matrix material.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 3A illustrates a first embodiment of an omega preform as woven.

FIG. 3B illustrates the omega preform of FIG. 3A after folding and as molded.

FIG. 4A illustrates a second embodiment of an omega preform as woven.

FIG. 4B illustrates the omega preform of FIG. 4A after folding and as molded.

FIG. 5A illustrates a third embodiment of an omega preform as woven.

FIG. 5B illustrates the omega preform of FIG. 5A after folding and as molded.

FIG. 6A illustrates a fourth embodiment of an omega preform as woven.

FIG. 6B illustrates the omega preform of FIG. 6A after folding and as molded.

FIG. 7A illustrates a fifth embodiment of an omega preform as woven.

FIG. 7B illustrates the omega preform of FIG. 7A after folding and as molded.

DETAILED DESCRIPTION

Figure 1:
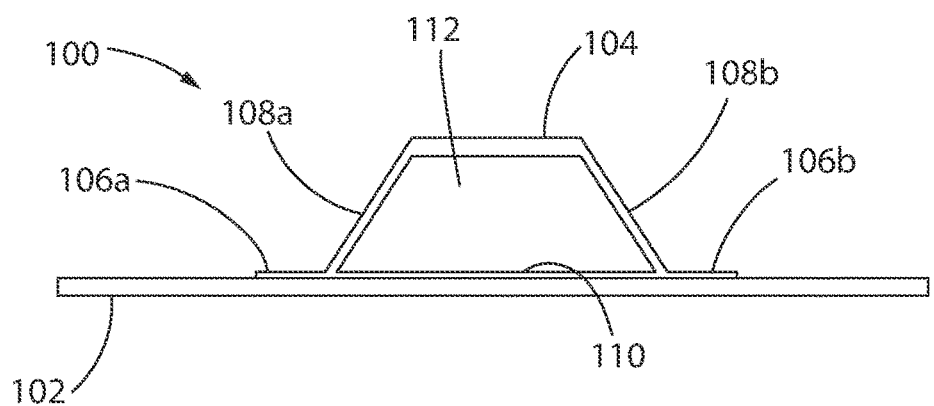
FIG. 1 illustrates an omega stiffener.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", "tows", and "yarns" are used interchangeably in the following description. "Threads", "fibers", "tows", and "yarns" as used herein can refer to monofilaments, multifilament yarns, twisted yarns, multifilament tows, textured yarns, braided tows, coated yarns, bicomponent yarns, as well as yarns made from stretch broken fibers of any materials known to those skilled in the art. Yarns can be made of carbon, nylon, rayon, fiberglass, cotton, ceramic, aramid, polyester, metal, polyethylene glass, and/or other materials that exhibit desired physical, thermal, chemical or other properties.

The term "folded" is broadly used herein to mean "forming", which includes unfolding, bending, and other such terms for manipulating the shape of the woven fabric.

For a better understanding of the invention, its advantages and objects attained by its uses, reference is made to the accompanying descriptive matter in which non-limiting, embodiments of the invention are illustrated in the accompanying drawings and in which corresponding components are identified by the same reference numerals.

As discussed above, it may be desired to provide substantially flat panels with additional stiffness to aid the panels in avoiding damage or unwanted deformation. The panels may also have a curvature. As such, stiffening members may be added to support the panels where desired.

A common cross-sectional shape for stiffeners 100 is shown in FIG. 1, which is illustrated as mounted to at least one skin or panel 102. Stiffener 100 may also be referred to as a "hat stiffener" or "omega stiffener", which terms are used interchangeably herein. Stiffener 100 includes a cap portion 104, foot portions 106a, 106b, web portions 108a, 108b, and inner wrap portion 110. Inner wrap portion 110 is illustrated as continuous in FIG. 1 but may alternatively be discontinuous. That is, the inner wrap portion may have a gap as shown in FIG. 5B, for example. Cap portion 104 is coupled to foot portions 106a, 106b and inner wrap portion by web portions 108a, 108b.

Stiffness of the omega stiffener is provided by web portions 108a, 108b and cap portion 104. Additional stiffness for the omega stiffener can be provided by a cap portion 104 that is thicker than foot portions 106a, 106b and web portions 108a, 108b. Web portions 108a, 108b may be thicker than foot portions 106a, 106b.

The "flange of the omega stiffener" means those portions of the omega stiffener that includes foot portions 106a, 106b, and, optionally, inner wrap portion 110. The omega stiffener is defined as "closed" when the cap portion, web portions, and inner wrap portion form an inner space of the stiffener 112 that is closed on all sides. The omega stiffener is defined as "open" when the inner space of the stiffener 112 formed by the cap portion, web portions, and inner wrap portion is not closed on all sides. For example, FIG. 5B illustrates an open inner space of the stiffener where there is a gap in the inner wrap portion.

The omega stiffener can be fabricated independently from the skin in which case the flange of the omega stiffener can be adhered to the skin by bonding or other attachment technique known to those of skill in the art. Alternatively, the omega stiffener may be fabricated, woven or co-molded, at the same time with one or more skins such that the omega stiffener and skin are portions of a common reinforced assembly. This specification describes techniques for fabricating a stand-alone omega stiffener independently from any skins.

An omega stiffener may be fabricated using conventional unidirectional or fabric pre-preg plies. This fabrication method does not have continuous fibers across intersection joints of the stiffener. These fabrication techniques are labor intensive and prone to delamination at the intersections of the cap portion and the web portions and also at the web portion and foot portions. The present disclosure is directed to these problems through the use of a three-dimensional (3D) woven preform that is either infused and b-staged (i.e., partially cured) for use with a pre-preg skin, or co-infused from the dry state with a dry fabric skin.

Figure 2:
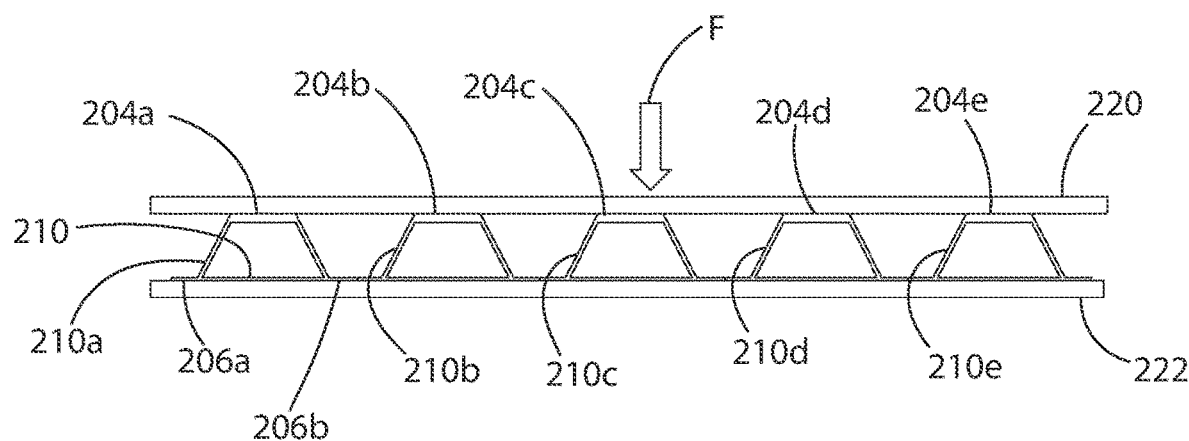
FIG. 2 exemplary usage for omega stiffeners providing stiffening support between two substantially parallel panels.

FIG. 2 illustrates an exemplary structure employing omega stiffeners to provide stiffening support for a surface. Omega stiffeners 210a to 210e are situated on a panel 222. The omega stiffeners can be used to support a surface 220. In but one example, surface 220 is an external surface of an airplane fuselage or other surface in which resistance to deformation is desired. Panel 222 and surface 220 are shown substantially parallel to one another but that is not a necessary requirement. Also, while five omega stiffeners are shown in FIG. 2, any number may be used as required by the application for the stiffeners. Foot portions 206a, 206b of omega stiffener 210a can be adhered or attached to panel 222. Optionally, inner wrap portion 210 may be adhered or attached to panel 222. In a similar manner, remaining omega stiffeners 210b to 210e are mounted to panel 222. Surface 220 is then supported on cap portions 204a to 204e of omega stiffeners 210a to 210e. Cap portions 204a to 204e may also be adhered to surface 220 through any means known to those of ordinary skill. The omega stiffeners can transfer a force F applied to surface 220 to panel 222 thereby aiding in resistance of surface 220 to deformation from the force. Moreover, the stiffness and quantity of omega stiffeners between panel 222 and surface 220 can enhance the resistance of surface 220 to deformation from the applied force. The use of the omega stiffeners in this application can reduce the weight of material necessary to reduce deformation of surface 220 and, in some instances, provide temperature and noise insulation across the structure.

The multilayer woven preform for composite material omega stiffener can be woven flat and folded into a three-dimensional (3D) shape with layer-to-layer interlocking of layers of warp fiber as well as interlocking of fibers within each layer.

This disclosure identifies several preforming concepts for a woven omega stiffener and a method of making same. In general, the disclosed omega stiffeners are comprised of warp and weft fibers that are flat woven by conventional means having continuous fiber across the joints between the web portions and the foot portions. The flat woven stiffener is folded as necessary into a preform having the omega-shaped cross section. The preform may then be molded and impregnated with a matrix material. The present disclosure provides configurations for the stiffener in the flat woven ("as-woven") state that can be molded ("as-molded") by folding into the 3D omega-shaped preform then impregnated with the matrix material to result in the desired omega stiffener.

The disclosed configurations may have advantages over prior omega stiffeners having multiple individual plies. The disclosed configurations can improve the pull-off strength of the stiffener by providing continuous fibers across the joints between the web portions and foot portions. The pull-off strength is the force required to pull the stiffener off the skin. The techniques disclosed to can also reduce the amount of touch labor required by replacing many individual plies with a single, multilayer preform.

Further, the flat woven fabric can be formed around a mandrel in the inner space after being woven. The mandrel disposed in the inner space aids in maintaining the shape of the inner space of the stiffener through subsequent handling. This has the advantage that the fabric is not formed into the stiffener shape until impregnation. As such, the fabric can be more easily handled because the mandrel maintains the shape of the inner space so one is not concerned about maintaining the final desired stiffener shape of the preform. Prior art designs form the stiffener shape by wrapping the fabric around a desired shape of mandrel while the fabric is being woven. This disadvantageously requires careful handling so that the fabric maintains the shape prior to impregnation.

Both open inner space and closed inner space omega stiffeners can be useful for stiffening substantially flat or curved plates. As the desired length of the stiffener becomes longer, closed inner space omega stiffeners it may be more difficult to insert a mandrel in the closed inner space as compared with open inner space configurations. In contrast, as the stiffeners become longer in length, open inner space configurations that can be simply wrapped around the mandrel are easier to fabricate than closed configuration stiffeners. As such, open configuration stiffeners may be more suitable for long stiffeners than closed inner space stiffeners.

Open inner space stiffeners may also be better suited than closed inner space stiffeners for high rate manufacturing. The flange in an open configuration stiffener is located on the skin and the mandrel is simply placed on top of it. The webs and cap are then wrapped around the mandrel to complete the stiffener. This configuration has the further benefit of providing a space between the two overlapping layers that make up the cap. Additional plies can be inserted into this space to increase stiffness if necessary.

The stiffeners can be woven "near net shape," which is a manufacturing technique in which the initial production of an item is very close to the final, or net shape, thereby reducing the need for surface or further finishing. As applied to the present disclosure, the fabric may be woven to near the final shape rather than oversize and cutting off waste material and can be woven on a captured shuttle loom so that all edges are stabilized. The use of a shuttle loom is not a requirement, but may be considered a cost effective choice when compared to other options such as rapier or needle looms. Regardless of the type of loom used, the preform will be woven so that the longitudinal direction of the stiffener is the warp direction of the loom. That is, the figures in this description illustrate a cross-sectional view of the stiffener across the weft direction of the fibers, the length of the stiffener being in the warp direction extending into the plane of the paper.

In all configurations, the thicknesses of the feet, webs, and cap can be adjusted independently by using different tow sizes and/or different warp tow spacing. Similarly, different interlocking patterns can be used in each of these sections to provide different effective properties. Sample fabrics have been woven using ply-to-ply interlock patterns. Other weaving options, such as orthogonal or angle interlock patterns, could be used.

FIGS. 3A-3B illustrate forming of an omega-shaped stiffener according to an embodiment of the invention. The stiffener is flat woven in the as-woven 300a form. The as-woven 300a form includes a cap portion 304, web portions 308a, 308b, foot portions 306a, 306b, and inner wrap portion 310, which are flat woven to form a closed inner space 312.

In the embodiment illustrated in FIGS. 3A-3B, cap portion 304 is flat woven so that the cap portion is divided into two cap areas 304a, 304b angled with respect to one another at an inflection point A on separate layers of the woven fabric. Similarly, inner wrap portion 310 is divided into two inner wrap areas 310a, 310b angled with respect to one another at an inflection point B on separate layers of the woven fabric. Closed inner space 312 is shown exaggerated to reveal the angular relationship between inner wrap areas 310a, 310b and cap areas 304a, 304b. Inner wrap areas 310a, 310b may be the same or a different length. Cap areas 304a, 304b may be the same or a different length.

Because the stiffener is flat-woven as a single piece, weft fibers will be continuous at least across the juncture between the web portions and the foot portions. Weft fibers also may be continuous across the juncture between the web portions and cap portion and/or inner wrap portions.

The as-woven 300a form is folded to produce the as-molded 300 omega-shaped stiffener. Cap areas 304a, 304b are unfolded to be substantially collinear to one another forming cap portion 304. Similarly, inner wrap areas 310a, 310b are unfolded to be substantially collinear to one another forming inner wrap portion 310. Foot portions 306a, 306b can be bent to be substantially collinear with the inner wrap portion. The omega-shaped stiffener is thereby produced.

Cap portion 304 is shorter in length than the inner wrap portion 310 and can be centered thereabove, which causes web portions 308a, 308b to be angled with respect to the inner wrap portion. A common angle between the inner wrap portion and the web portions is in the range of 60 to 90 degrees. It should be recognized that any or all of the leg portions, inner wrap portions, web portions, and cap portion themselves can be multilayer fabrics interwoven to alter the thickness of a particular portion. Moreover, cap portion 304 can be thicker—have more interwoven fabric layers—than web portions 308a, 308b, which, in turn can be thicker than inner wrap portion 310.

This embodiment of the as-molded omega-shaped stiffener 300 has a closed inner space 312. For ease of handling the stiffener, a mandrel (not shown) having the shape of the inner space 312 may be introduced into the inner space 312 of the as-molded 300 omega-shaped stiffener. The mandrel can aid in having the stiffener maintain the desired omega shape during handling and impregnation operations.

FIGS. 4A-4B illustrate forming of an omega-shaped stiffener according to another embodiment of the invention. The stiffener is flat woven in the as-woven 400a form. The as-woven 400a form includes a cap portion 404, web portions 408a, 408b, foot portions 406a, 406b, and inner wrap portion 410, which are flat woven to form a closed inner space 412.

In the embodiment illustrated in FIGS. 4A-4B, web portions 408a, 408b are flat woven so that the web portion 404a is divided into two web areas 408aa, 408ab angled with respect to one another at an inflection point C on separate layers of the woven fabric. Similarly, web portions 408a, 408b are flat woven so that the web portion 408b is divided into two web areas 408ba, 408bb angled with respect to one another at an inflection point D on separate layers of the woven fabric. Closed inner space 412 is shown exaggerated to reveal the angular relationship between web areas 408aa, 408ab and web areas 408ba, 408bb.

Because the stiffener is flat-woven as a single piece, weft fibers will be continuous at least across the juncture between the web portions and the foot portions. Weft fibers also may be continuous across the juncture between the web portions and cap portion and/or inner wrap portions.

The as-woven 400a form is folded to produce the as-molded 400 omega-shaped stiffener. Web areas 408aa, 408ab are unfolded to be substantially collinear to one another forming web portion 408a. Similarly, web areas 408ba, 408bb are unfolded to be substantially collinear to one another forming web portion 408b. Foot portions 406a, 406b and cap portion 404 can be formed, if necessary. The omega-shaped stiffener is thereby produced.

Cap portion 404 is shorter in length than the inner wrap portion 410 and can be centered thereabove, which causes web portions 408a, 408b to be angled with respect to the inner wrap portion. A common angle between the inner wrap portion and the web portions is in the range of 60 to 90 degrees. It should be recognized that any or all of the leg portions, inner wrap portions, web portions, and cap portion themselves can be multilayer fabrics interwoven to alter the thickness of a particular portion. Moreover, cap portion 404 can be thicker—have more interwoven fabric layers—than web portions 408a, 408b, which, in turn can be thicker than inner wrap portion 410.

This embodiment of the as-molded omega-shaped stiffener 400 has a closed inner space 412. For ease of handling the stiffener, a mandrel (not shown) having the shape of the inner space 412 may be introduced into the inner space 412 of the as-molded 400 omega-shaped stiffener. The mandrel can aid in having the stiffener maintain the desired omega shape during handling and impregnation operations.

FIGS. 5A-5B illustrate forming of an omega-shaped stiffener according to an embodiment of the invention. The stiffener is flat woven in the as-woven 500a form. The as-woven 500a form includes a cap portion 504, web portions 508a, 508b, foot portions 506a, 506b, and inner wrap portions 510a, 510b, which are flat woven. In this embodiment, inner wrap portions 510a, 510b are not contiguous with one another. Rather, foot portion 506a and inner wrap portion 510a are attached to, and extend from, web portion 508a. Similarly, foot portion 506b and inner wrap portion 510b are attached to, and extend from, web portion 508b. In FIG. 5A, gap 516a is shown exaggerated to illustrate that foot portion 506a is not interwoven with inner portion 510a. Similarly, gap 516b is shown exaggerated to illustrate that foot portion 506b is not interwoven with inner portion 510b Because the stiffener is flat-woven as a single piece, weft fibers will be continuous at least across the juncture between the web portions and the foot portions. Weft fibers also may be continuous across the juncture between the web portions and cap portion and/or inner wrap portions.

The as-woven 500a form is folded to produce the as-molded 500 omega-shaped stiffener. Inner wrap areas 510a, 510b are folded to be substantially collinear to one another. Foot portions 506a, 506b can be folded to be substantially collinear with the inner wrap area. The length of the inner wrap areas is selected so that a gap 514 is produced when the stiffener is folded into the omega shape creating an open inner space 512. The omega-shaped stiffener is thereby produced.

The length of the inner wrap areas and gap are selected to form an omega stiffener of desired geometry. Cap portion 504 is shorter in length than the cumulative length of inner wrap areas 510a, 510b and gap 514 and can be centered thereabove, which causes web portions 508a, 508b to be angled with respect to the inner wrap portions. A common angle between the inner wrap portion and the web portions is in the range of 60 to 90 degrees. Moreover, cap portion 504 can be thicker—have more interwoven fabric layers—than web portions 508a, 508b, which, in turn can be thicker than inner wrap portion 510.

This embodiment of the as-molded omega-shaped stiffener 500 has an open inner space 512. For ease of handling the stiffener, a mandrel (not shown) having the shape of the inner space 512 may be introduced into the inner space 512 of the as-molded 500 omega-shaped stiffener. The mandrel can aid in having the stiffener maintain the desired omega shape during handling and impregnation operations.

FIGS. 6A-6B illustrate forming of an omega-shaped stiffener according to an embodiment of the invention. The stiffener is flat woven in the as-woven 600a form. The as-woven 600a form includes a cap portion 604, web portions 608a, 608b, foot portions 606a, 606b, and inner wrap portion having inner wrap areas 610a, 610b, which are flat woven.

In this embodiment, inner wrap areas 610a, 610b and foot portions 606a, 606b are woven contiguous with one another forming a first layer of the flat woven stiffener 600a. Web portions 608a, 608b are woven continuous with one another and separated from one another by cap portion 604 forming a second layer of the flat woven stiffener 600a. The first and second layers are attached where the ends of the web portions meet the junctures 616a, 616b of the inner wrap portions and leg portions, respectively. The first and second layers are not otherwise interwoven.

Rather, foot portion 606a and inner wrap area 610a are attached to, and extend from, web portion 608a. Similarly, foot portion 606b and inner wrap area 610b are attached to, and extend from, web portion 608b.

Because the stiffener is flat-woven as a single piece, weft fibers will be continuous at least across the juncture between the web portions and the foot portions. Weft fibers also may be continuous across the juncture between the web portions and cap portion and/or inner wrap portions.

The as-woven 600a form is folded to produce the as-molded 600 omega-shaped stiffener. Inner wrap areas 610a, 610b are folded to be substantially collinear to one another. Foot portions 606a, 606b can be folded to be substantially collinear with the inner wrap areas. A gap 614 is produced by cutting out a piece from the inner wrap portion 610 to form open inner space 612. The omega-shaped stiffener is thereby produced.

The length of the inner wrap portion and gap are selected to form an omega stiffener of desired geometry. Cap portion 604 is shorter in length than the cumulative length of inner wrap portions 610a, 610b and gap 614 and can be centered thereabove, which causes web portions 608a, 608b to be angled with respect to the inner wrap portions. A common angle between the inner wrap portion and the web portions is in the range of 60 to 90 degrees. It should be recognized that any or all of the leg portions, inner wrap portions, web portions, and cap portion themselves can be multilayer fabrics interwoven to alter the thickness of a particular portion. Moreover, cap portion 604 can be thicker—have more interwoven fabric layers—than web portions 608a, 608b, which, in turn can be thicker than inner wrap portion 610.

This embodiment of the as-molded omega-shaped stiffener 600 has an open inner space 612. For ease of handling the stiffener, a mandrel (not shown) having the shape of the inner space 612 may be introduced into the inner space 612 of the as-molded 600 omega-shaped stiffener. The mandrel can aid in having the stiffener maintain the desired omega shape during handling and impregnation operations.

FIGS. 7A-7B illustrate forming of an omega-shaped stiffener according to another embodiment of the invention. The stiffener is flat woven in the as-woven 700a form. The as-woven 700a form includes a cap portion 704, web portions 708a, 708b, foot portions 706a, 706b, and inner wrap portion 710, which are flat woven to form a closed inner space 712.

In the embodiment illustrated in FIGS. 7A-7B, cap portion 704 is flat woven to have two cap areas 704a, 704b. Each of the cap areas 704a, 704b is woven to have a thickness that is less than the desired thickness of cap portion 704. The cap areas 704a, 704b are woven to respective web portions 708a, 708a but separated from one another. Because the stiffener is flat-woven as a single piece, weft fibers will be continuous at least across the juncture between the web portions and the foot portions. Weft fibers also may be continuous across the juncture between the web portions and cap portion and/or inner wrap portions.

The as-woven 700a form is folded to produce the as-molded 700 omega-shaped stiffener. Web portion 708a, 708b and cap areas 704a, 704b are folded to cause the cap areas to lie upon one another. To form cap portion 704. The thickness of cap areas 704a, 704b combine to result in the cap having the desired thickness. The cap areas may be bonded together where they contact one another 716 by any known means. The omega-shaped stiffener is thereby produced.

Cap portion 704 is shorter in length than the inner wrap portion 710 and can be centered thereabove, which causes web portions 708a, 708b to be angled with respect to the inner wrap portion. A common angle between the inner wrap portion and the web portions is in the range of 60 to 90 degrees. It should be recognized that any or all of the leg portions, inner wrap portions, web portions, and cap portion themselves can be multilayer fabrics interwoven to alter the thickness of a particular portion. Moreover, cap portion 704 can be thicker—have more fabric layers—than web portions 708a, 708b, which, in turn can be thicker than inner wrap portion 710.

This embodiment of the as-molded omega-shaped stiffener 700 has a closed inner space 712. For ease of handling the stiffener, a mandrel (not shown) having the shape of the inner space 712 may be introduced into the inner space 712 of the as-molded 700 omega-shaped stiffener. The mandrel can aid in having the stiffener maintain the desired omega shape during handling and impregnation operations.

In any of the embodiments of the omega-shaped stiffener, the stiffener can be impregnated with a matrix material. The matrix material includes epoxy, bismaleimide, polyester, vinyl-ester, ceramic, carbon, and other such materials.

Other embodiments are within the scope of the following claims.

The invention claimed is:
1. A method of forming a 3D woven stiffener comprising:
flat weaving a plurality of layers of interwoven warp and weft fibers;
interweaving portions of some of the layers with other layers into a flat woven fabric having a cap portion, a first web portion and a second web portion, a first foot portion and second foot portion, and an inner wrap portion; and
forming the flat woven fabric to form an omega-shaped (Ω) stiffener having a closed inner space, wherein at least some of the weft fibers are continuous across a juncture between the web portions and the foot portions; and wherein interweaving of the portions of some of the layers with other layers includes causing the gap portion to have two cap areas folded against one another and the inner wrap portion to have two inner wrap areas folded against one another.

2. The method of claim 1, comprising unfolding the cap areas so that the two cap areas are substantially collinear and unfolding the two inner wrap areas so that the inner wrap areas are substantially collinear.

3. The method of claim 2, wherein the cap portion is thicker than the web portions and the web portions are thicker than the foot portions.

4. The method of claim 2, comprising impregnating the omega-shaped (Ω) stiffener with a matrix material.

5. A method of forming a 3D woven stiffener comprising:
flat weaving a plurality of layers of interwoven warp and weft fibers;
interweaving portions of some of the layers with other layers into a flat woven fabric having a gap portion, a first web portion and a second web portion, a first foot portion and second foot portion, and an inner wrap portion; and
forming the flat woven fabric to form an omega-shaped (Ω) stiffener having a closed inner space,
wherein at least some of the weft fibers are continuous across a juncture between the web portions and the foot portions; and
wherein interweaving of the portions of some of the layers with other layers includes causing the first web portion to have two first web areas folded against one another and the second web portion to have two second web areas folded against one another.

6. The method of claim 5, comprising unfolding first web areas of the first web portion so that the first web areas of the first web portion are substantially collinear; and
unfolding second web areas of the second web portion so that the second web areas of the second web portion are substantially collinear.

7. The method of claim 6, wherein the cap portion is thicker than the web portions and the web portions are thicker than the foot portions.

8. The method of claim 6, comprising impregnating the omega-shaped (Ω) stiffener with a matrix material.

9. A method of forming a 3D woven stiffener comprising:
flat weaving a plurality of layers of interwoven warp and weft fibers;
interweaving portions of some of the layers with other layers into a flat woven fabric having a gap portion, a first web portion and a second web portion, a first foot portion and second foot portion, and an inner wrap portion; and
forming the flat woven fabric to form an omega-shaped (Ω) stiffener having a closed inner space,
wherein at least some of the weft fibers are continuous across a juncture between the web portions and the foot portions; and
wherein interweaving of the portions of some of the layers with other layers includes causing the cap portion to have a first cap area and a second cap area, each of the cap areas having a thickness that is less than a desired thickness of the cap portion,
wherein the first cap area is woven to the first web portion, the second cap area is woven to the second web portion and the first and second cap areas are separated from one another.

10. The method of claim 9, comprising forming the first web portion with first cap area, and forming the second web portion with the second cap area so the first cap area lies directly upon the second cap area to form the cap portion of the woven stiffener.

11. The method of claim 10, wherein the cap portion is thicker than the web portions and the web portions are thicker than the foot portions.

12. The method of claim 10, comprising impregnating the omega-shaped (Ω) stiffener with a matrix material.

13. A method of forming a 3D woven stiffener comprising:
flat weaving a plurality of layers of interwoven warp and weft fibers;
interweaving portions of some of the layers with other layers into a flat woven fabric having a cap portion, a first web portion and a second web portion, a first foot portion and second foot portion, and an inner wrap portion; and
forming the flat woven fabric to form an omega-shaped (Ω) stiffener having an open inner space,
wherein at least some of the weft fibers are continuous across a juncture between the web portions and the foot portions; and
wherein the cap portion is thicker than the web portions and the web portions are thicker than the foot portions.

14. The method of claim 13, wherein the inner wrap portion is woven into a first inner wrap area and a second inner wrap area separated from one another by the first web portion, cap portion, and second web portion.

15. The method of claim 14, comprising forming first inner wrap area and second inner wrap area to be substantially collinear and separated from one another by a gap.

16. The method of claim 13, comprising impregnating the omega-shaped (Ω) stiffener with a matrix material.

17. The method of claim 13, wherein the inner wrap portion has a first inner wrap area and a contiguous second inner wrap area.

18. The method of claim 17, comprising:
forming a first inner wrap area and second inner wrap area to be substantially collinear; and
cutting a portion of the first and second inner wrap areas to form a gap between the first inner wrap area and second inner wrap area.

19. The method of claim 18, comprising impregnating the omega-shaped (Ω) stiffener with a matrix material.

20. A 3D woven stiffener comprising:
a plurality of layers of interwoven warp and weft fibers;
wherein some of the layers are interwoven with other layers into a woven fabric having a cap portion, a first web portion and a second web portion, a first foot portion and a second foot portion, an inner wrap portion, and an inner space;
wherein at least some of the weft fibers are continuous across a juncture between the web portions and the foot portions; and
wherein the cap portion is thicker than the web portions and the web portions are thicker than the foot portions.

21. The stiffener of claim 20, wherein the inner space of the stiffener is closed.

22. The stiffener of claim 20, wherein the inner space of the stiffener is open.

\* \* \* \* \*